United States Patent
Maheshwari et al.

(10) Patent No.: US 7,870,103 B1
(45) Date of Patent: Jan. 11, 2011

(54) TOLERATING AND REPORTING COLLISIONS IN CONTENT-DERIVED IDENTIFIERS OF DATA SEGMENTS USING SECONDARY IDENTIFIERS

(75) Inventors: Umesh Maheshwari, San Jose, CA (US); R. Hugo Patterson, Mountain View, CA (US)

(73) Assignee: EMC Corporation, Hopkinton, MA (US)

( * ) Notice: Subject to any disclaimer, the term of this patent is extended or adjusted under 35 U.S.C. 154(b) by 143 days.

(21) Appl. No.: 11/251,618

(22) Filed: Oct. 13, 2005

(51) Int. Cl.
*G06F 7/00* (2006.01)
*G06F 17/00* (2006.01)

(52) U.S. Cl. .................. 707/687; 707/640; 707/698

(58) Field of Classification Search ............... 726/6; 701/114; 702/106; 707/101, 102, 201, 204, 707/999.006, 999.101, 687; 709/203, 206, 709/225, 227

See application file for complete search history.

(56) References Cited

U.S. PATENT DOCUMENTS

| | | | | |
|---|---|---|---|---|
| 5,204,966 | A * | 4/1993 | Wittenberg et al. | 726/6 |
| 6,212,525 | B1 * | 4/2001 | Guha | 707/101 |
| 2002/0199096 | A1 * | 12/2002 | Wenocur et al. | 713/153 |
| 2003/0055552 | A1 * | 3/2003 | Akins et al. | 701/114 |
| 2003/0159036 | A1 * | 8/2003 | Walmsley et al. | 713/168 |
| 2004/0049678 | A1 * | 3/2004 | Walsmley et al. | 713/168 |
| 2004/0225881 | A1 * | 11/2004 | Walmsley et al. | 713/161 |

* cited by examiner

*Primary Examiner*—Mohammad Ali
*Assistant Examiner*—Alexey Shmatov
(74) *Attorney, Agent, or Firm*—Van Pelt, Yi & James LLP (57) ABSTRACT

A method for tolerating collisions of identifiers for data segments is disclosed. The method comprises combining a primary identifier and secondary identifier of a first segment to make a combined identifier of the first segment and combining a primary identifier and secondary identifier of a second segment to make a combined identifier of the second segment. The method further comprises determining if the combined identifier of the first segment is the same as the combined identifier of the second segment.

23 Claims, 7 Drawing Sheets

200

Index

| Primary Key | Secondary Key |
|---|---|
| Primary ID P1<br>Primary ID P1<br>... | Secondary ID S1<br>Secondary ID S2<br>... |
| Primary ID P2<br>Primary ID P3<br>... | Secondary ID S3<br>Secondary ID S4<br>... |
| •<br>•<br>• | •<br>•<br>• |
| Primary ID P9<br>Primary ID P9<br>... | Secondary ID S10<br>Secondary ID S11<br>... |
| •<br>•<br>• | •<br>•<br>• |

Index

| Primary Key | Secondary Key |
|---|---|
| Primary ID P1<br>Primary ID P1<br>. . . | Secondary ID S1<br>Secondary ID S2<br>. . . |
| Primary ID P2<br>Primary ID P3<br>. . . | Secondary ID S3<br>Secondary ID S4<br>. . . |
| •<br>•<br>• | •<br>•<br>• |
| Primary ID P9<br>Primary ID P9<br>. . . | Secondary ID S10<br>Secondary ID S11<br>. . . |
| •<br>•<br>• | •<br>•<br>• |

TOLERATING AND REPORTING COLLISIONS IN CONTENT-DERIVED IDENTIFIERS OF DATA SEGMENTS USING SECONDARY IDENTIFIERS

BACKGROUND OF THE INVENTION

Some data storage systems attempt to store data segments with no redundancy in order to efficiently use the storage space available. This is particularly applicable for backup systems. The data segments are identified by content derived identifiers derived from the data in the data segments. An example of a content derived identifier includes a hash calculated on the data segment. The content derived identifiers are stored, and used for retrieving the data segments when the original data stream is reconstructed. Since identical data segments result in the same identifier, a duplicate data segment can be identified and prevented from being stored again. Because the content derived identifiers usually have fewer bits than the corresponding data segments, it is possible for two non-identical data segments to have the same identifier, resulting in a collision that may lead to a unique data segment not being stored and thereby not being able to be recovered in the future. Also, specific content derived identifiers may have known non-identical data segments with the same identifiers thus opening up the possibility of malicious data corruption. It would be valuable to be able to detect collisions so that a unique data segment would be recoverable in the future. Furthermore, it would be valuable to report that a collision occurred so that system administrators can assess the collision resistance of the system.

SUMMARY OF THE INVENTION

A system for tolerating collisions of identifiers for data segments comprises a processor and a memory. The processor is configured to combine a primary identifier and secondary identifier of a first segment to make a combined identifier of the first segment, combine a primary identifier and secondary identifier of a second segment to make a combined identifier of the second segment, and determine if the combined identifier of the first segment is the same as the combined identifier of the second segment. The memory is coupled to the processor and configured to provide instructions to the processor.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Tolerating and reporting collisions in content derived identifiers of data segments using a secondary identifier is disclosed. Primary and secondary identifiers are calculated for a data segment. In some embodiments, using the primary and secondary identifiers together as an identifier allows tolerating any non-simultaneous collisions that occur separately in either the primary or secondary identifiers. In some embodiments, in the event that the primary identifiers match for two distinct data segments, the secondary identifiers are checked. In the event that the secondary identifiers are not the same for the two distinct data segments, the secondary identifiers are used to be able to report a collision in the primary identifiers.

Figure 1:
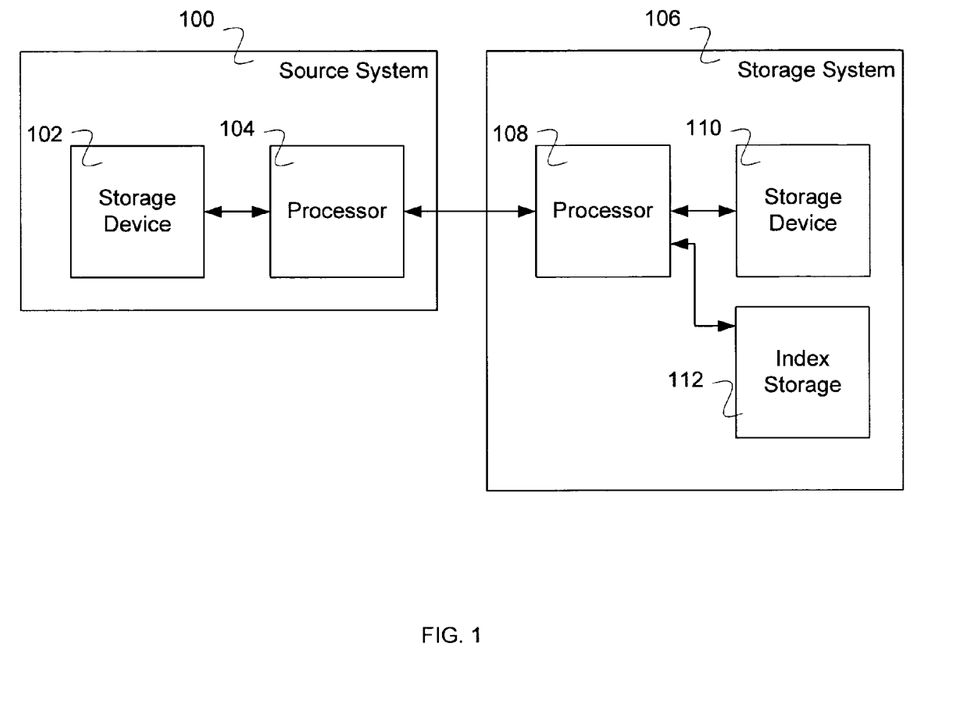
FIG. 1 illustrates a system for tolerating and reporting collisions in content derived identifiers of data segments in one embodiment.

FIG. 1 illustrates a system for tolerating and reporting collisions in content derived identifiers of data segments in one embodiment. In the example shown, source system 100 includes storage device 102 and processor 104. Storage system 106 includes processor 108, storage device 110, and index storage 112. Source system 100 is the source of information that is to be stored on storage system 106. Source information from storage device 102 is processed by processor 104 and transmitted to storage system 106. The processed source information is received by storage system 106 and processed by processor 108 before being stored on storage device 110. Index storage 112 stores information used to index stored information on storage device 110. In some embodiments, stored index information includes primary and secondary identifiers for data segments. In some embodiments, the index is sorted first by the primary identifiers and next by the secondary identifiers. In various embodiments, the index is a tree index or a hash table index. In various embodiments, storage device 102 and storage device 110 include a plurality of storage devices. Storage device 102 and storage device 110 can be a magnetic hard drive, a redundant array of magnetic hard drives, a tape drive, an optical drive, a flash drive or any other storage device for storing digital information. In various embodiments, source system 100 and/or storage system 106 comprise one or more separate computer systems with one or more separate processors. In various embodiments, source information from source system 100 is transmitted to storage system 106 using a direct connection, a local network connection, a wide area network connection, a wireless network connection, the internet, or any other connection able to appropriately transmit the information.

Figure 2:
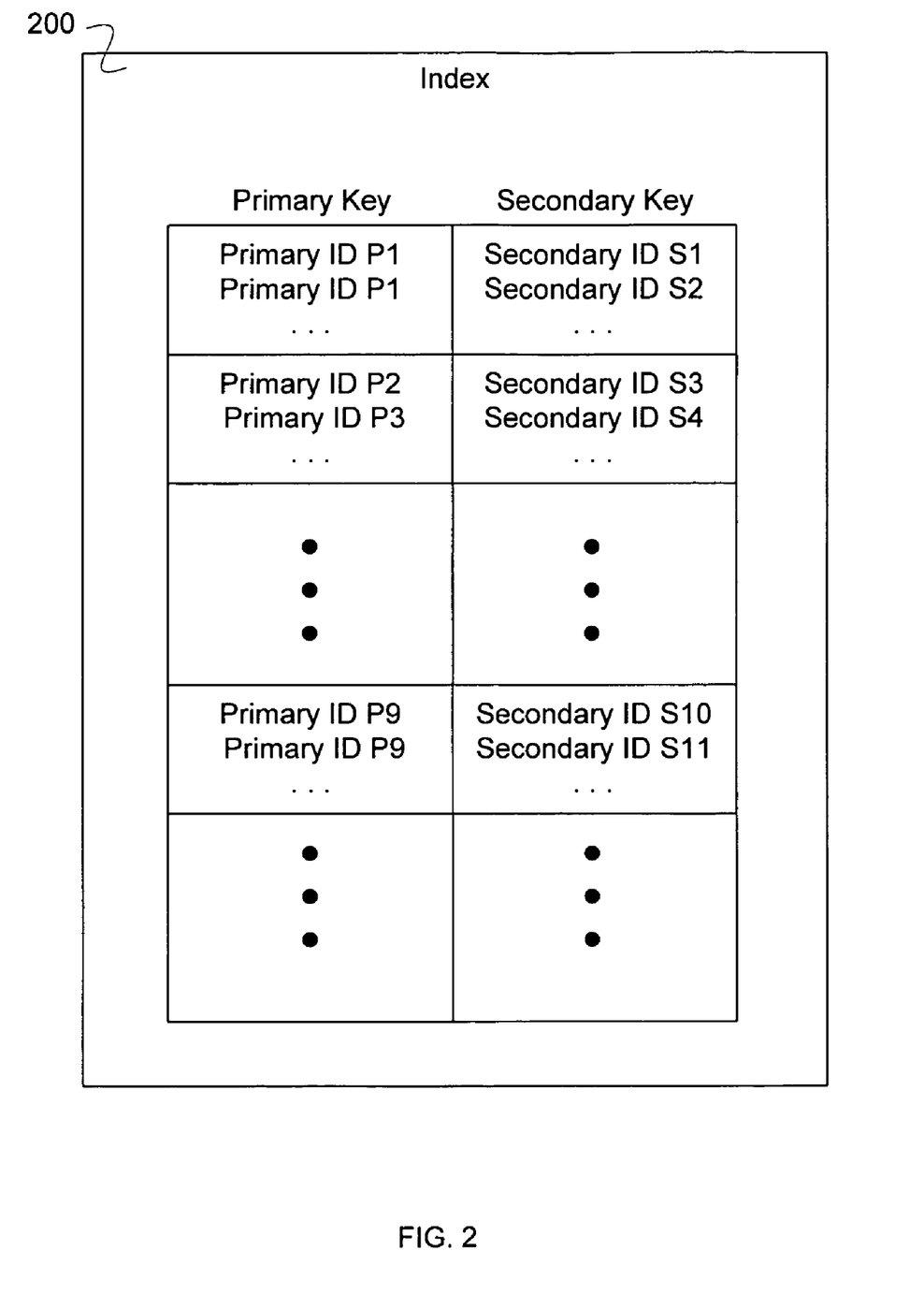
FIG. 2 illustrates an index for information stored on a storage system storage device in one embodiment.

FIG. 2 illustrates an index for information stored on a storage system storage device in one embodiment. In some embodiments, index 200 of FIG. 2 is used as an index for information stored on a storage system storage device (such as disk 110) and is stored in index storage 112 (see FIG. 1). In the example shown, index 200 includes a plurality of primary keys and a plurality of secondary keys. The plurality of primary keys is represented in FIG. 2 by primary ID P1, primary ID P2, primary ID P3, and primary ID P9. The plurality of secondary keys is represented in FIG. 2 by secondary ID S1, secondary ID S2, secondary ID S3, secondary ID S4, secondary ID S10, and secondary ID S11. The primary ID P1 is paired with both secondary ID S1 and secondary ID S2. In various embodiments, the secondary ID S1 and secondary ID S2 are used to indicate that a collision has occurred with the primary ID P1 or to tolerate the collision. The primary ID P9 is paired with both secondary ID S10 and secondary ID S11. In various embodiments, the secondary ID S10 and secondary ID S11 are used to indicate that a collision has occurred with primary ID P9 or to tolerate the collision.

In some embodiments, the primary key, or the primary identifier (primary ID), is a hash function and the secondary key, or the secondary identifier (secondary ID), is another hash function. In some embodiments, the primary key, or the primary identifier is a cryptographic hash function. A hash function takes a long string (or message) of any length as input and produces a fixed length string as output. Hash functions include byte-wise XOR, checksums, redundancy checks (for example, Fletcher's checksum, Adler-32, and cyclic redundancy checks), byte-wise sums (for example, a 4-byte sum), a Rabin fingerprint, and Fowler-Noll-Vo (FNV) hash function. A cryptographic hash function is a hash function suitable for use as a collision resistant identifier of data. A cryptographic hash function typically has properties including 1) given h, it should be hard to find m such that h=hash(m); 2) given m1, it should be hard to find m2 (not equal to m1) such that hash(m1)=hash(m2); and 3) it should be hard to find two different m1 and m2 such that hash(m1)= hash(m2). Cryptographic hash functions include SHA-1 (Secure Hash Algorithm 1), MD5 (Message-Digest algorithm 5), and RIPEMD-160 (RACE Integrity Primitives Evaluation Message Digest 160-bit version).

In some embodiments, the identifier is a similar to identifiers as described in U.S. patent application Ser. No. 10/611, 309 by Patterson entitled: "DATA STORAGE USING IDENTIFIERS".

Figure 3:
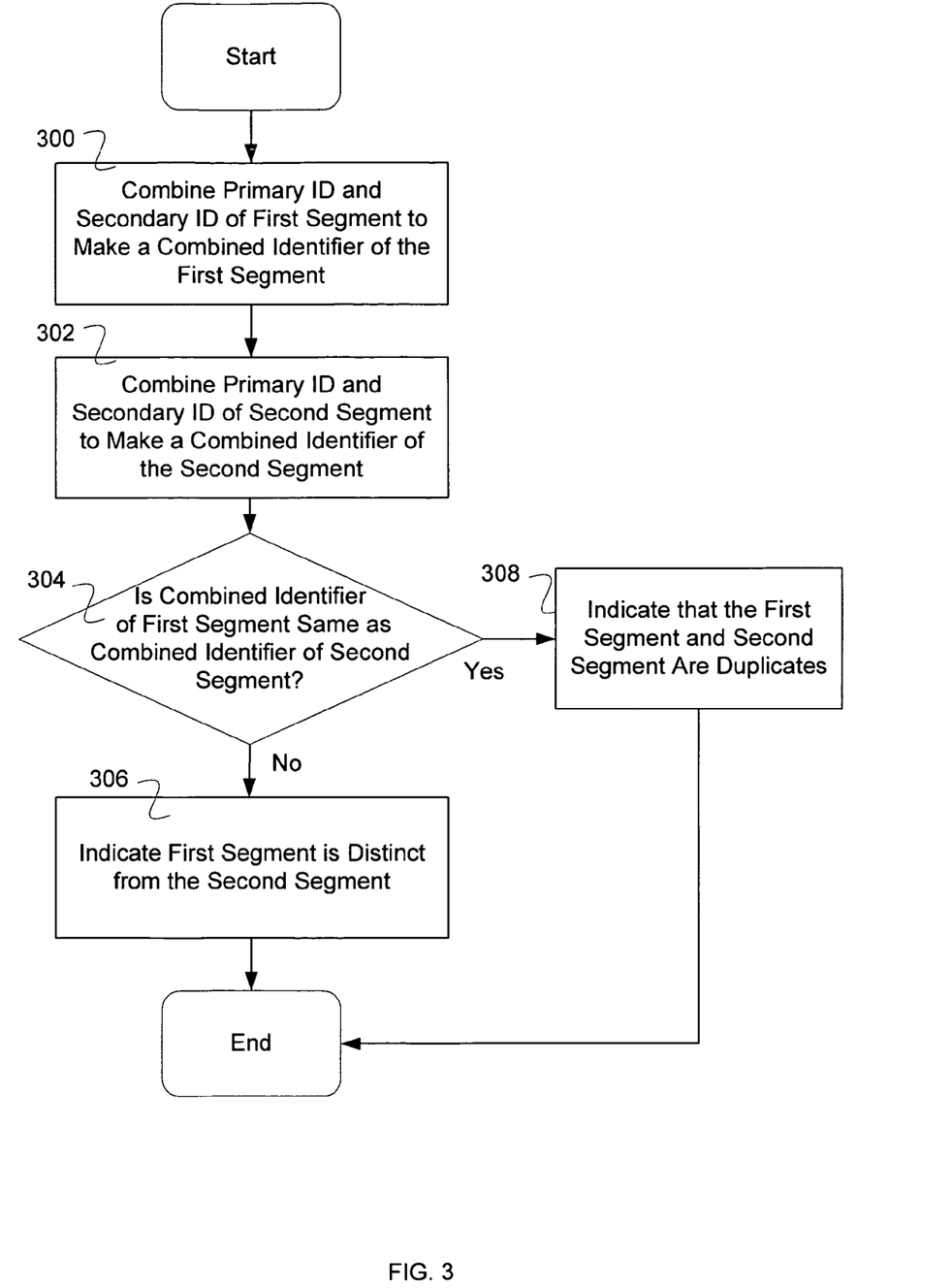
FIG. 3 illustrates an embodiment of a process for tolerating collisions in identifiers of data segments.

FIG. 3 illustrates an embodiment of a process for tolerating collisions in identifiers of data segments. In the example shown, in 300 the primary ID and the secondary ID of a first segment are combined to make a combined identifier of the first segment. In 302, the primary ID and the secondary ID of a second segment are combined to make a combined identifier of the second segment. In 304, it is determined if the combined identifier of the first segment is the same as the combined identifier of the second segment. If the combined identifier of the first segment is not the same as the combined identifier of the second segment, then in 306 it is indicated that the first segment is distinct from the second segment and the process ends. The first segment will be indicated as distinct from the second segment even if the primary ID of the first segment and the primary ID of the second segment are the same as long as the secondary ID of the first segment and the secondary ID of the second segment are also not the same. This indication of the difference between the segments allows the system to be tolerant of collisions in the primary ID. In some embodiments, the primary ID function is chosen to be extremely unlikely to have collisions; however, because rare collisions or malicious collisions are possible for known primary ID functions, a combined identifier allows the toleration of collisions of ID's from distinct data segments in the primary ID function.

If the combined identifier of the first segment is the same as the combined identifier of the second segment, then in 308 it is indicated that the first and the second segment are duplicates and the process ends. In some embodiments, the first segment and the second segment are confirmed to be duplicates by direct comparison. In some embodiments, if it is confirmed that the first segment and the second segment are duplicates, then it is indicated that the segments are duplicates. In some embodiments, if it first segment and the second segment are not duplicates then it is indicated that the segments are not duplicates and a collision has occurred.

In some embodiments, a first segment is compared to stored segments—one or more second segments—to see if they have already been stored, or are duplicates. In some embodiments, a first segment is compared only to stored segments in a set of one or more stored segments to see if they have already been stored, or are duplicates. This reduces the number of checks required to see if there are duplicates. In some embodiments, the set of one or more stored segments is based at least in part on the primary ID.

Figure 4:
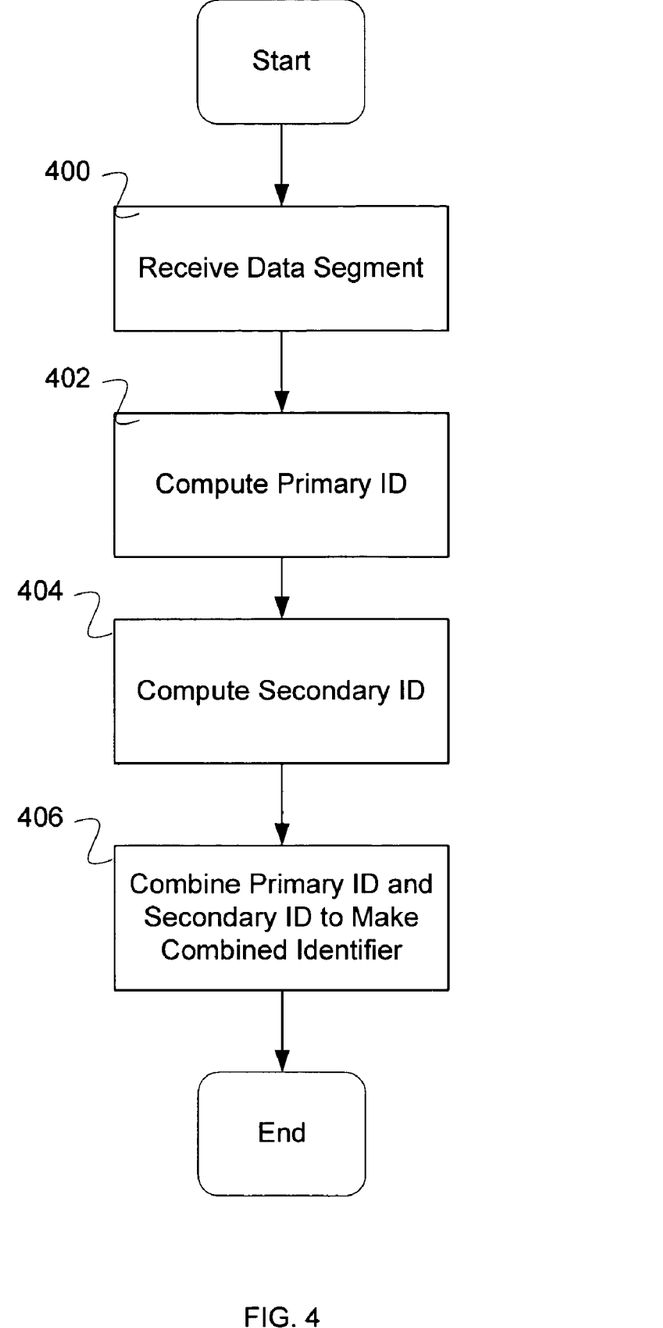
FIG. 4 illustrates an embodiment of a process for combining a primary ID and secondary ID for a data segment.

FIG. 4 illustrates an embodiment of a process for combining a primary ID and secondary ID for a data segment. In some embodiments, the process illustrated in FIG. 4 is used to implement 300 and 302 in FIG. 3. In the example illustrated, the segment is received in 400. In 402, the primary ID is computed. In various embodiments, the primary ID is calculated using a hash function, a cryptographic hash function, or any other appropriate function that minimizes collisions and produces an identifier for the data segment. In 404, the secondary ID is computed. In various embodiments, the secondary ID comprises a hash function, a cryptographic hash function, or any other appropriate function that produces an identifier. In 406, the primary ID and the secondary ID are combined to make a combined identifier. In various embodiments, the primary ID and the secondary ID are concatenated, are interleaved, or are combined in any other appropriate manner so as to allow the ID's to be used as identifiers.

Figure 5:
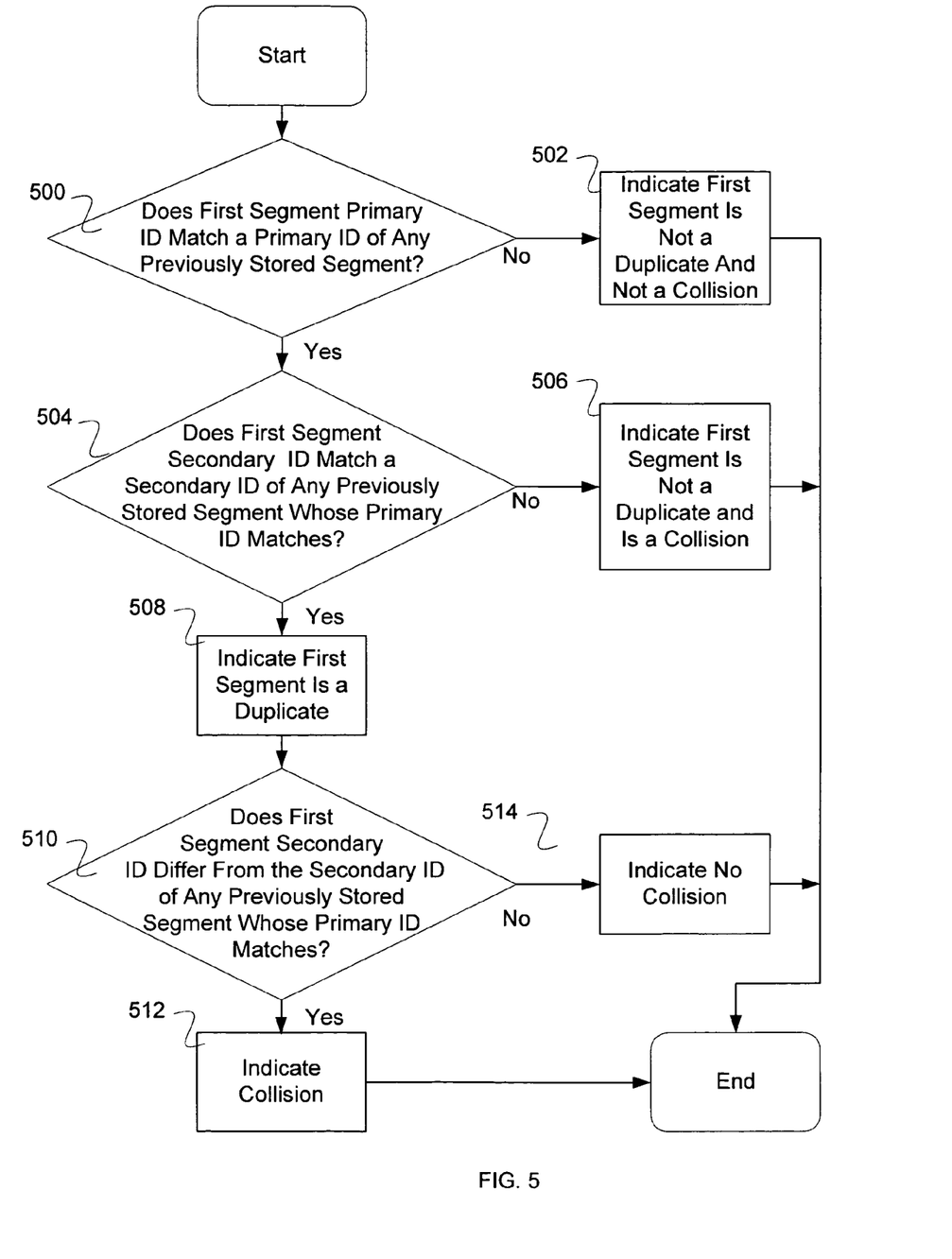
FIG. 5 illustrates an embodiment of a process for tolerating and reporting collisions in a content derived identifier for data segments using a secondary identifier.

FIG. 5 illustrates an embodiment of a process for tolerating and reporting collisions in a content derived identifier for data segments using a secondary identifier. In the example shown, in 500 it is determined if a first segment primary ID matches a primary ID of any previously stored segment. In some embodiments, the search for matches is reduced to a subset of all of the previously stored segments by searching based on a subset of primary ID's. In some embodiments, the index is organized in a manner that allows quick and easy access while searching for a specific primary ID —for example, a sorted list, a tree structure, or any other appropriate organization for a quick and easy search. If the first segment primary ID does not match a primary ID of any preciously stored segment, then in 502 it is indicated that the first segment is not a duplicate and not a collision, and the process ends.

If it is determined that the first segment primary ID matches a primary ID of any previously stored segment, then in 504 it is determined if the first segment secondary ID matches a secondary ID of any previously stored segment whose primary ID matches. If it is determined that the first segment secondary ID does not match a secondary ID of any previously stored segment, then in 506 it is indicated that the first segment is not a duplicate and there is a collision and the process ends. If it is determined that the first segment secondary ID matches a secondary ID of any previously store segment, the in 508 it is indicated that the first segment is a duplicate and control passes to 510.

In 510, it is determined if the first segment secondary ID differs from the secondary ID of any previously stored segment whose primary ID matches. If the first segment secondary ID does not differ from the secondary ID of any previously stored segment whose primary ID matches, then in 514 it is indicated that there is no collision and the process ends. If the first segment secondary ID differs from the secondary ID of any previously stored segment whose primary ID matches, then in 512 it is indicated that there is a collision and the process ends.

Figure 6:
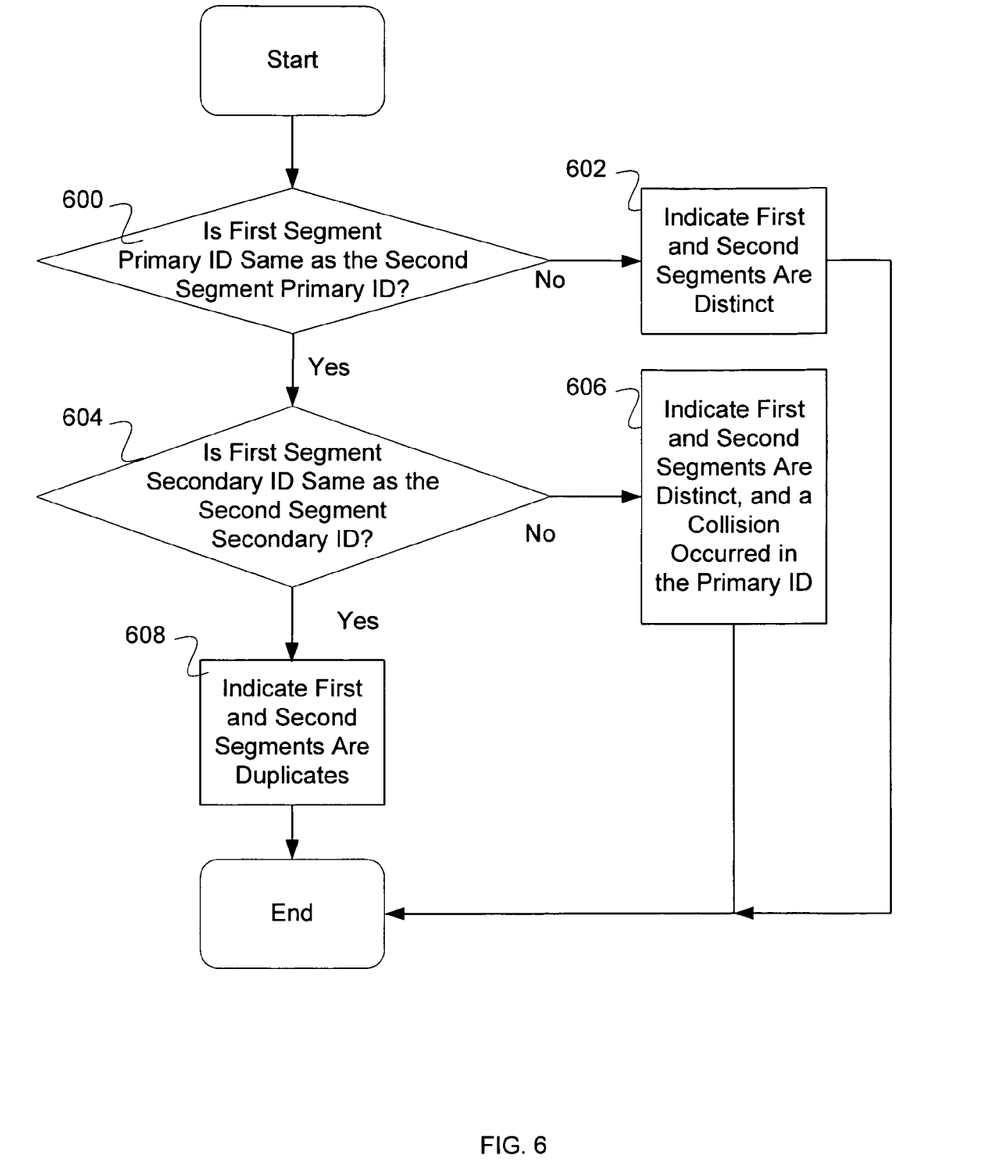
FIG. 6 illustrates an embodiment of a process for tolerating and reporting collisions in a content derived identifier for data segments using a secondary identifier.

FIG. 6 illustrates an embodiment of a process for tolerating and reporting collisions in a content derived identifier for data segments using a secondary identifier. In the example illustrated, in 600 it is determined if the first segment primary ID is the same as the second segment primary ID. If the first segment primary ID is not the same as the second segment primary ID, then control passes to 602. In 602, it is indicated that the first segment and the second segment are distinct, and the process ends. If the first segment primary ID is the same as the second segment primary ID, then control passes to 604. In 604, it is determined if the first segment secondary ID is the same as the second segment secondary ID. If the first segment secondary ID is not the same as the second segment secondary ID, then control passes to 606. In 606, it is indicated that the first segment and the second segment are distinct and that a collision occurred in the primary ID, and the process ends. If the first segment secondary ID is the same as the second segment secondary ID, then it is indicated that the first segment and the second segment are duplicates in 608, and the process ends.

In some embodiments, a first segment is compared to stored segments—one or more second segments—to see if they have already been stored, or are duplicates. In some embodiments, a first segment is compared to a subset of stored segments (one or more second segments) to see if they have already been stored or if they are duplicates. This reduces the number of checks required to see if there are duplicates. In some embodiments, the subset of stored segments is determined at least in part based on the primary ID. In some embodiments, the index is organized to make the searching of the subset of stored segments efficient—for example, a sorted list, a tree index, or any other appropriate method of making the search more efficient.

Figure 7:
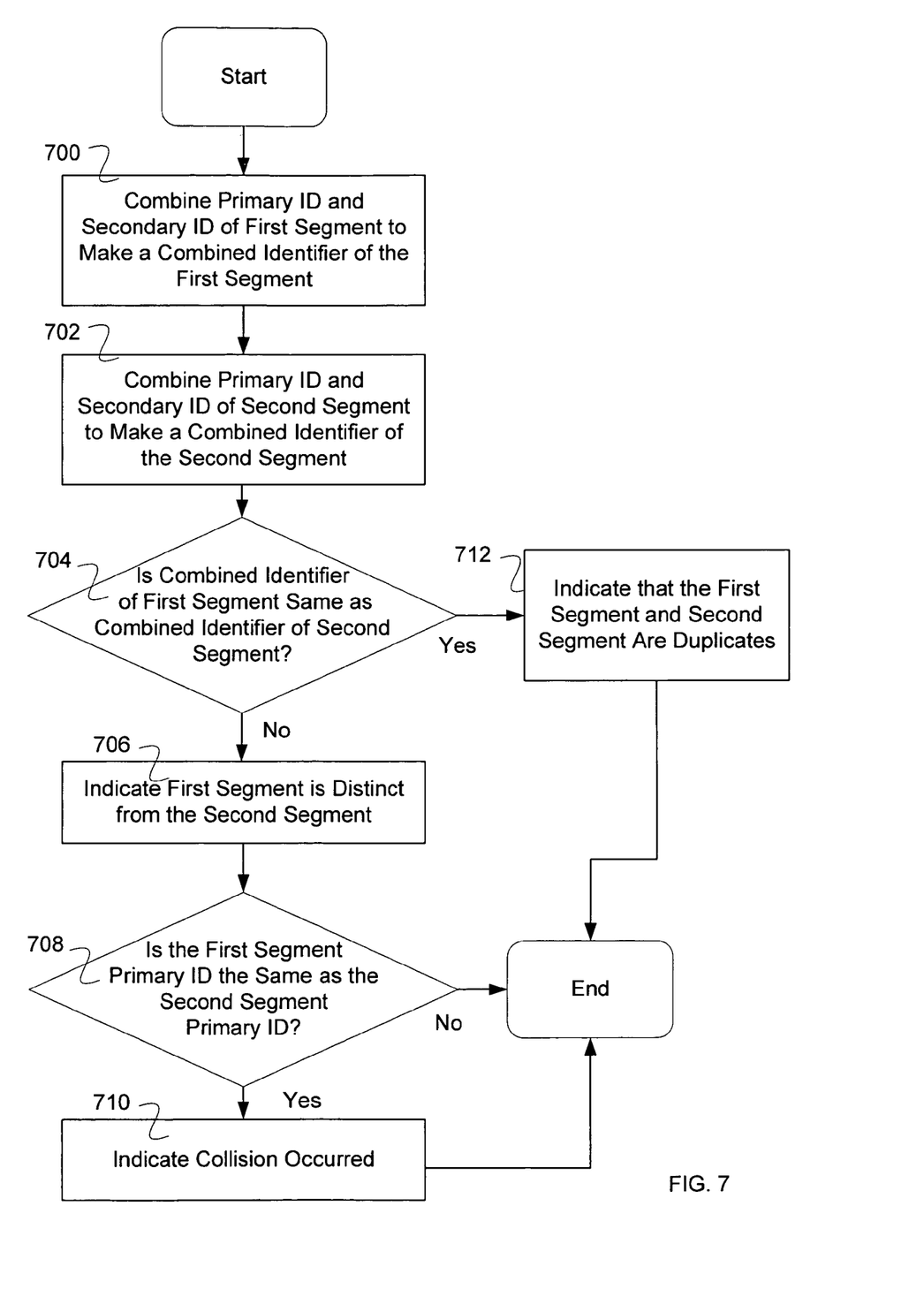
FIG. 7 illustrates an embodiment of a process for tolerating and reporting collisions in a content derived identifier for data segments using a secondary identifier.

FIG. 7 illustrates an embodiment of a process for tolerating and reporting collisions in a content derived identifier for data segments using a secondary identifier. In the example shown, in 700 the primary ID and the secondary ID of a first segment are combined to make a combined identifier of the first segment. In 702, the primary ID and the secondary ID of a second segment are combined to make a combined identifier of the second segment. In 704, it is determined if the combined identifier of the first segment is the same as the combined identifier of the second segment. If the combined identifier of the first segment is not the same as the combined identifier of the second segment, then in 706 it is indicated that the first segment is distinct from the second segment and control is passed to 708. In 708, it is determined if the first segment primary ID is the same as the second segment primary ID. If the first segment primary ID and the second segment primary ID are the same, then control passes to 710. In 710, it is indicated that a collision has occurred, and the process ends. If the first segment primary ID and the second segment primary ID are not the same, then the process ends.

If the combined identifier of the first segment is the same as the combined identifier of the second segment, then in 712 it is indicated that the first and the second segment are duplicates and the process ends. In some embodiments, the first segment and the second segment are confirmed to be duplicates by direct comparison. In some embodiments, if it is confirmed that the first segment and the second segment are duplicates, then it is indicated that the segments are duplicates. In some embodiments, if it first segment and the second segment are not duplicates then it is indicated that the segments are not duplicates and a collision has occurred.

In some embodiments, a first segment is compared to stored segments—one or more second segments—to see if they have already been stored, or are duplicates. In some embodiments, a first segment is compared only to a subset of one or more stored segments to see if they have already been stored or are duplicates. This reduces the number of checks required to see if there are duplicates. In some embodiments, the subset of stored segments is determined at least in part based on the primary ID. In some embodiments, the index is organized to make the searching of the subset of stored segments efficient—for example, a sorted list, a tree index, or any other appropriate method of making the search more efficient.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for tolerating collisions of identifiers for data segments comprising:
   combining a primary identifier and secondary identifier of a first segment to make a combined identifier of the first segment, wherein an original data stream is reconstructed using a plurality of data segments retrieved using a plurality of identifiers, wherein the primary identifier is one of the plurality of identifiers, and wherein the first segment is one of the plurality of data segments;
   combining a primary identifier and secondary identifier of a second segment to make a combined identifier of the second segment;
   determining that the primary identifier of the first segment is the same as the primary identifier of the second segment;
   determining that the secondary identifier of the first segment and the secondary identifier of the second segment differ;
   indicating that a collision occurred in the primary identifier, wherein the collision comprises when the first segment and the second segment are not identical, wherein future recovery of the first segment or the second segment uses the indication;
   wherein the primary identifier of the first segment is obtained, using a processor, by applying a first function to the first segment and the secondary identifier of the first segment is obtained by applying a second function to the first segment;

wherein the primary identifier of the second segment is obtained by applying the first function to the second segment and the secondary identifier of the second segment is obtained by applying the second function to the second segment; and in the event that the combined identifier of the first segment is the same as the combined identifier of the second segment, indicating that the first segment and the second segment are duplicates.

2. A method as in claim 1, further including in the event that the combined identifier of the first segment is not the same as the combined identifier of the second segment, indicating that the first segment and the second segment are distinct.

3. A method as in claim 1, wherein the primary identifier is computed using a hash function.

4. A method as in claim 1, wherein the primary identifier is computed using a cryptographic hash function.

5. A method as in claim 1, wherein the primary identifier is computed using SHA-1.

6. A method as in claim 1, wherein the primary identifier is computed using MD5.

7. A method as in claim 1, wherein the primary identifier is computed using RIPEMD-160.

8. A method as in claim 1, wherein the secondary identifier is computed using a Rabin fingerprint.

9. A method as in claim 1, wherein the secondary identifier is computed using a hash function.

10. A method as in claim 1, wherein the secondary identifier is computed using a checksum.

11. A method as in claim 1, wherein the secondary identifier is computed using redundancy check.

12. A method as in claim 1, wherein the secondary identifier is computed using Rabin fingerprint.

13. A method as in claim 1, wherein the secondary identifier is computed using Fowler-Noll-Vo hash.

14. A system for tolerating collisions of identifiers for data segments comprising:
a processor configured to:
combine a primary identifier and secondary identifier of a first segment to make a combined identifier of the first segment, wherein original data stream is reconstructed using a plurality of data segments retrieved using a plurality of identifiers, wherein the primary identifier is one of the plurality of identifiers, and wherein the first segment is one of the plurality of data segments;
combine a primary identifier and secondary identifier of a second segment to make a combined identifier of the second segment;
determine that the primary identifier of the first segment is the same as the primary identifier of the second segment;
determine that the secondary identifier of the first segment and the secondary identifier of the second segment differ;
indicate that a collision occurred in the primary identifier, wherein the collision comprises when the first segment and the second segment are not identical, wherein future recovery of the first segment or the second segment uses the indication;
wherein the primary identifier of the first segment is obtained, using a processor, by applying a first function to the first segment and the secondary identifier of the first segment is obtained by applying a second function to the first segment;
wherein the primary identifier of the second segment is obtained by applying the first function to the second segment and the secondary identifier of the second segment is obtained by applying the second function to the second segment; and
in the event that the combined identifier of the first segment is the same as the combined identifier of the second segment, indicate that the first segment and the second segment are duplicates; and
a memory coupled to the processor and configured to provide instructions to the processor.

15. A system as in claim 14, wherein the processor is further configured to, in the event that the combined identifier of the first segment is not the same as the combined identifier of the second segment, indicate that the first segment and the second segment are distinct.

16. A system as in claim 14, wherein the primary identifier is computed using a hash function.

17. A system as in claim 14, wherein the primary identifier is computed using a cryptographic hash function.

18. A system as in claim 14, wherein the secondary identifier is computed using a hash function.

19. A computer program product for tolerating collisions of identifiers for data segments, the computer program product being embodied in a computer readable storage medium and comprising computer instructions for:
combining a primary identifier and secondary identifier of a first segment to make a combined identifier of the first segment, wherein an original data stream is reconstructed using a plurality of data segments retrieved using a plurality of identifiers, wherein the primary identifier is one of the plurality of identifiers, and wherein the first segment is one of the plurality of data segments;
combining a primary identifier and secondary identifier of a second segment to make a combined identifier of the second segment;
determining that the primary identifier of the first segment is the same as the primary identifier of the second segment;
determining that the secondary identifier of the first segment and the secondary identifier of the second segment differ;
indicating that a collision occurred in the primary identifier, wherein the collision comprises when the first segment and the second segment are not identical, wherein future recovery of the first segment or the second segment uses the indication;
wherein the primary identifier of the first segment is obtained, using a processor, by applying a first function to the first segment and the secondary identifier of the first segment is obtained by applying a second function to the first segment;
wherein the primary identifier of the second segment is obtained by applying the first function to the second segment and the secondary identifier of the second segment is obtained by applying the second function to the second segment; and
in the event that the combined identifier of the first segment is the same as the combined identifier of the second segment, indicating that the first segment and the second segment are duplicates.

20. A computer program product as recited in claim 19, the computer program product further comprising computer instructions for, in the event that the combined identifier of the first segment is not the same as the combined identifier of the second segment, indicating that the first segment and the second segment are distinct.

21. A computer program product as recited in claim 19, wherein the primary identifier is computed using a hash function.

22. A computer program product as recited in claim 19, wherein the primary identifier is computed using a cryptographic hash function.

23. A computer program product as recited in claim 19, wherein the secondary identifier is computed using a hash function.

* * * * *